(12) United States Patent
Tanaka et al.

(10) Patent No.: US 12,335,857 B2
(45) Date of Patent: Jun. 17, 2025

(54) COMMUNICATION DEVICE AND COMMUNICATION METHOD

(71) Applicant: Sony Group Corporation, Tokyo (JP)

(72) Inventors: Yusuke Tanaka, Tokyo (JP); Naoki Kusashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/599,217

(22) Filed: Mar. 8, 2024

(65) Prior Publication Data

US 2024/0214917 A1 Jun. 27, 2024

Related U.S. Application Data

(63) Continuation of application No. 17/312,002, filed as application No. PCT/JP2019/051184 on Dec. 26, 2019, now Pat. No. 11,930,447.

(30) Foreign Application Priority Data

Jan. 9, 2019 (JP) .................. 2019-001580

(51) Int. Cl.
*H04W 48/18* (2009.01)
*H04W 72/0453* (2023.01)
*H04W 72/51* (2023.01)

(52) U.S. Cl.
CPC ....... *H04W 48/18* (2013.01); *H04W 72/0453* (2013.01); *H04W 72/51* (2023.01)

(58) Field of Classification Search
CPC .............................. H04W 72/30; H04L 5/001
(Continued)

(56) References Cited

U.S. PATENT DOCUMENTS

2004/0028003 A1* 2/2004 Diener ................. H04L 1/1664
370/373
2009/0323608 A1 12/2009 Adachi et al.
(Continued)

FOREIGN PATENT DOCUMENTS

JP  2004-080707 A  3/2004
JP  2006-287664 A  10/2006
(Continued)

OTHER PUBLICATIONS

International Search Report and Written Opinion mailed on Mar. 17, 2020, received for PCT Application PCT/JP2019/051184, Filed on Dec. 26, 2019, 14 pages including English Translation.
(Continued)

*Primary Examiner* — Kiet M Doan
(74) *Attorney, Agent, or Firm* — XSENSUS LLP

(57) ABSTRACT

The communication device includes a first transceiver configured to communicate on a first frequency band that is an unlicensed band and a second transceiver configured to communicate on a second frequency band that is an unlicensed band different from the first frequency band. A controller of the communication device is configured to control transmission of data using either one frequency band of communication on the first frequency band or communication on the second frequency band on the basis of information regarding a resource on the second frequency band transmitted from a first communication device. The present technology is applicable to, for example, a communication device and the like that conducts wireless communication standardized by IEEE 802.11.

6 Claims, 11 Drawing Sheets

(58) Field of Classification Search
USPC .......................... 455/522, 323; 370/252, 330
See application file for complete search history.

(56) References Cited

U.S. PATENT DOCUMENTS

| | | | |
|---|---|---|---|
| 2012/0099460 A1* | 4/2012 | Murakami | H04B 7/0452 370/252 |
| 2015/0016378 A1* | 1/2015 | Urabe | H04L 69/28 370/329 |
| 2016/0233989 A1* | 8/2016 | Belghoul | H04L 5/001 |
| 2017/0105216 A1 | 4/2017 | Jung et al. | |
| 2018/0146480 A1* | 5/2018 | Chendamarai Kannan | H04W 72/1268 |
| 2019/0082465 A1 | 3/2019 | Yoshimoto et al. | |

FOREIGN PATENT DOCUMENTS

| | | |
|---|---|---|
| JP | 2010-011397 A | 1/2010 |
| JP | 2017-539123 A | 12/2017 |
| JP | 2018-160847 A | 10/2018 |
| WO | 2011/099150 A1 | 8/2011 |
| WO | 2017/159272 A1 | 9/2017 |

OTHER PUBLICATIONS

Li Jianing et al: "A Hybrid Access Scheme in LTE Licensed Assisted Access Networks", 2018 IEEE/CIC International Conference on Communications in China (ICCC), IEEE, Aug. 16, 2018 (Aug. 16, 2018), pp. 588-592, XP033517311, DOI: 10.1109/ICCCHINA.2018.8641213 [retrieved on Feb. 12, 2019].

Karaki Reem et al: "Performance of Autonomous Uplink Transmissions in Unlicensed Spectrum LTE", Globecom 2017—2017 IEEE Global Communications Conference, IEEE, Dec. 4, 2017 (Dec. 4, 2017), pages XP033300175, DOI: 10.1109/GLOCOM.2017.8254599 [retrieved on Jan. 11, 2018].

Partial Supplementary European Search Report issued Feb. 7, 2022, in corresponding European Patent Application No. 19909050.7.

* cited by examiner

FIG. 6

| Signal Type | Length | Maximum Acceptable Delay | Priority | Data Amount | Frequency of Data |
|---|---|---|---|---|---|

FIG. 7

| Signal Type | Length | Allocated ID | Time Resource | Frequency Resource | Spatial Stream Resource | NOMA Resource | Inherit Resource | No Allocation |

FIG. 11

| Signal Type | Length | Non-allocated Transmission | Obtaining Transmission Opportunity |
|---|---|---|---|

COMMUNICATION DEVICE AND COMMUNICATION METHOD

CROSS-REFERENCE TO RELATED APPLICATIONS

The present application is a continuation of U.S. application Ser. No. 17/312,002, filed Jun. 9, 2021, which is based on PCT filing PCT/JP2019/051184, filed Dec. 26, 2019, which claims priority to JP 2019-001580, filed Jan. 9, 2019, the entire contents of each are incorporated herein by reference.

TECHNICAL FIELD

The present technology relates to communication devices and communication methods, and more particularly to a communication device and a communication method capable of achieving low-delay communication stably on an unlicensed band.

BACKGROUND ART

Use cases including data that should be transmitted with a low delay, such as factory automation, spread of online games on mobile devices, are emerging. Also in wireless communication on an unlicensed band with which communication is conducted on the basis of a carrier sense, a mechanism for transmitting data with a low delay is demanded in order to support such use cases. In the wireless communication on an unlicensed band, methods available are a random access method in which every device obtains a communication opportunity in an autonomously distributed manner and makes transmission, and a scheduled access method in which a base station or the like makes transmission using a communication opportunity that has been allocated in a centralized control manner.

In the random access method, each terminal voluntarily obtains a communication opportunity. Hence, there is not overhead associated with an allocation of the communication opportunity, and the delay time can be reduced. However, the communication opportunity may not be obtained due to interference, and the worst value of the delay time may increase. On the other hand, in the scheduled access method, the communication opportunity can be obtained at regular intervals, so the worst value of the delay time can be reduced. However, there is an overhead associated with the allocation, and the transmission cannot be made until the allocated communication opportunity. Hence, the delay time may increase.

Patent Document 1 discloses a method for designating a resource in transmission on an unlicensed band from a predetermined resource, on the basis of control information transmitted on a licensed band. However, in the wireless communication on an unlicensed band with which the communication is conducted on the basis of the carrier sense, even in a case where a resource is designated, obtaining of a communication opportunity is not guaranteed, and the delay time until transmission may increase.

Patent Document 2 discloses a method for using long term evolution (LTE) and new radio (NR) together as radio access technology (RAT), so as to achieve a low delay by enabling the transmission without a resource allocation. However, in order to ensure the delay time, it is assumed that a licensed band that does not need the carrier sense is used together, and the method cannot be adapted to the communication on an unlicensed band.

CITATION LIST

Patent Document

Patent Document 1: Japanese Patent Application Laid-Open No. 2017-539123
Patent Document 2: Japanese Patent Application Laid-Open No. 2018-160847

SUMMARY OF THE INVENTION

Problems to be Solved by the Invention

The present technology has been made in view of such circumstances, and enables low-delay communication stably on an unlicensed band.

Solutions to Problems

A communication device according to a first aspect of the present technology, includes: a first communication unit configured to communicate on a first frequency band that is an unlicensed band; a second communication unit configured to communicate on a second frequency band that is an unlicensed band different from the unlicensed band of the first frequency band; and a controller configured to control transmission of data using either one frequency band of communication on the first frequency band or the communication on the second frequency band on the basis of information regarding a resource on the second frequency band transmitted from a first communication device.

A communication method according to the first aspect of the present technology by a communication device including a first communication unit configured to communicate on a first frequency band that is an unlicensed band, and a second communication unit configured to communicate on a second frequency band that is an unlicensed band different from the unlicensed band of the first frequency band, and the communication method includes controlling transmission of data using either one frequency band of communication on the first frequency band or the communication on the second frequency band on the basis of information regarding a resource on the second frequency band transmitted from a first communication device.

According to the first aspect of the present technology, control is conducted to transmit data using either one frequency band of communication on the first frequency band that is an unlicensed band or the communication on the second frequency band that is an unlicensed band different from the first frequency band on the basis of information regarding a resource on the second frequency band transmitted from a first communication device.

A communication device according to a second aspect of the present technology includes: a first communication unit configured to communicate on a first frequency band that is an unlicensed band; a second communication unit configured to communicate on a second frequency band that is an unlicensed band different from the unlicensed band of the first frequency band; and a controller configured to allocate a resource of another communication device on the second frequency band on the basis of information regarding traffic that has been obtained from the another communication device via either the first communication unit or the second communication unit.

A communication method according to the second aspect of the present technology by a communication device including a first communication unit configured to communicate on a first frequency band that is an unlicensed band, and a second communication unit configured to communicate on a second frequency band that is an unlicensed band different from the unlicensed band of the first frequency band, the communication method including allocating a resource of another communication device on the second frequency band on the basis of information regarding traffic that has been obtained from the another communication device via either the first communication unit or the second communication unit.

According to the second aspect of the present technology, a resource of another communication device on the second frequency band is allocated on the basis of information regarding traffic that has been obtained from the another communication device via either the first communication unit that conducts communication on a first frequency band that is an unlicensed band or the second communication unit that conducts the communication on a second frequency band that is an unlicensed band different from the first frequency band.

The communication device may be an independent device or an internal block constituting one device.

BRIEF DESCRIPTION OF DRAWINGS

FIG. 6 is a diagram showing an example of a signal format of information regarding traffic.

FIG. 7 is a diagram showing an example of a signal format of information regarding a resource.

FIG. 11 is a diagram showing an example of a signal format of information regarding a resource.

MODE FOR CARRYING OUT THE INVENTION

Hereinafter, embodiments for carrying out the present technology (hereinafter, referred to as embodiments) will be described. It is to be noted that the description will be given in the following order.

1. Configuration example of wireless communication system
2. Block diagram showing configuration example of communication device
3. First communication process example
4. Second communication process example 1. Configuration Example of Wireless Communication System FIG. 1 shows a configuration example of a wireless communication system according to an embodiment to which the present technology is applied.

Figure 1:
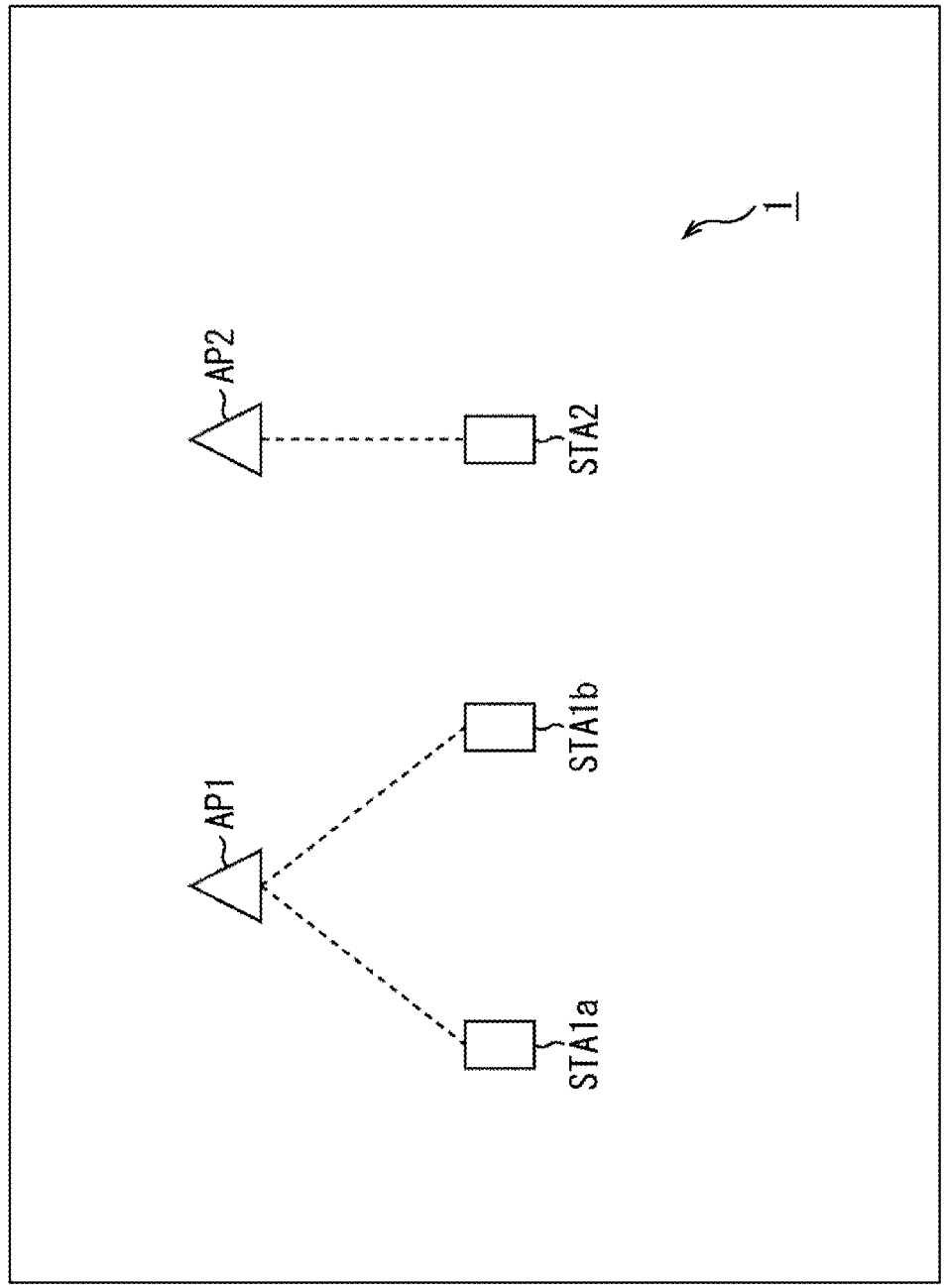
FIG. 1 is a diagram showing a configuration example of a wireless communication system according to an embodiment to which the present technology is applied.

A wireless communication system 1 of FIG. 1 constitutes, for example, a wireless local area network (LAN) standardized by Institute of Electrical and Electronic Engineers (IEEE) 802.11. In a wireless LAN, a base station access point (AP) and one or more slave stations (STA) that are connected with the base station AP to conduct communication form a network named basic service set (BSS), and start communication in an autonomously distributed manner in the unit of BSS, so as to conduct wireless communication. The wireless communication system 1 of FIG. 1 includes a plurality of BSSs, and includes a plurality of base stations AP and the slave station(s) STA connected with each base station AP.

Specifically, the wireless communication system 1 includes base stations AP1 and AP2 and slave stations STA1$a$, STA1$b$, and STA2. The slave stations STA1$a$ and STA1$b$ are slave stations STA connected with the base station AP1. The slave station STA2 is a slave station STA connected with the base station AP2. For example, the base station AP1 and the slave stations STA1$a$ and STA1$b$ constitute one BSS (BSS1), and the base station AP2 and the slave stations STA2 constitute one BSS (BSS2). The slave stations STA1$a$ and STA1$b$ communicate wirelessly with the base station AP1, and the slave station STA2 communicates wirelessly with the base station AP2. The BSS1 and BSS2 are set in a positional relationship of interference.

It is to be noted that the number of the BSSs constituting the wireless communication system 1, the number of the base stations AP, and the number of the slave stations STA connected with each base station AP for conducting communication are optional, and are not limited to the numbers shown in FIG. 1.

2. Block Diagram Showing Configuration Example of Communication Device

Figure 2:
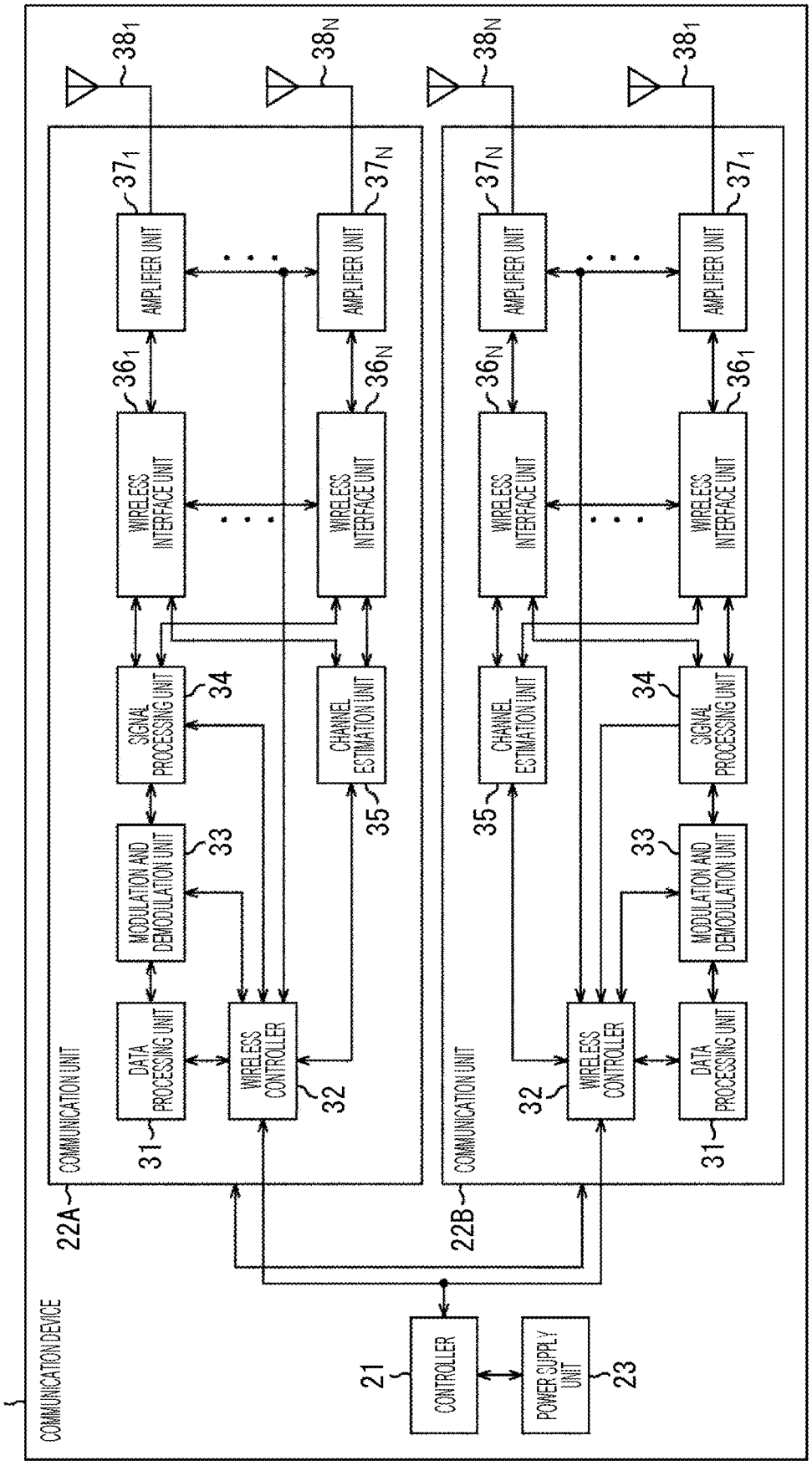
FIG. 2 is a block diagram showing a configuration example of a communication device operating as a base station AP or a slave station STA in FIG. 1.

FIG. 2 is a block diagram showing a configuration example of a communication device that operates as the base station AP or the slave station STA of FIG. 1.

A communication device 10 of FIG. 2 includes a controller 21, a communication unit 22A, a communication unit 22B, and a power supply unit 23.

The communication unit 22A (a first communication unit) and the communication unit 22B (a second communication unit) conduct wireless communication using different access methods or frequency bands from each other, according to the control of the controller 21. The communication unit 22A and the communication unit 22B have the same configurations. That is, the communication unit 22A and the communication unit 22B are different in the access method or frequency band, in conducting wireless communication under the control of the controller 21, but a practicable access method or frequency band is the same with each other. At least one of the access method or the frequency band may be different, or both may be different between the communication unit 22A and the communication unit 22B. In the following description, in a case where the communication unit 22A and the communication unit 22B are distinguished from each other, they will be referred to as the first communication unit 22A and the second communication unit 22B, whereas in a case where the communication unit 22A and the communication unit 22B are not particularly distinguished from each other, they will be referred to as the communication unit 22.

Examples of the frequency bands on which the communication unit 22 is capable of conducting communication include, for example, 2.4 GHz band and 5 GHz band, in a case of a wireless LAN standardized by IEEE 802.11. In addition, the access method in which the communication unit 22 is communicable includes, for example, a method in which each communication device 10 as a slave station STA obtains a communication opportunity in an autonomously distributed manner and makes transmission (hereinafter, referred to as a random access method) and a method in which each communication device 10 as a slave station STA makes transmission using a communication opportunity that has been allocated in a centralized control manner by a base station AP or the like (hereinafter, referred to as a scheduled access method).

Both 2.4 GHz band and 5 GHz band are so-called unlicensed bands, which are frequency bands for which a wireless station license is not required and on which users are able to freely install and use devices that have obtained authentication. The communication device 10 communicates on one of the two frequency bands of the unlicensed bands by using the random access method, and communicates on the other one by using the scheduled access method.

It is to be noted that, for example, in communicating using three or more unlicensed bands, the communication device 10 can include three or more communication units 22. As another unlicensed band, for example, 6 GHz band can be used.

The communication unit 22 includes a data processing unit 31, a wireless controller 32, a modulation and demodulation unit 33, a signal processing unit 34, a channel estimation unit 35, a wireless interface unit $36_i$, an amplifier unit $37_i$, and an antenna $38_i$ (i=1, 2, . . . , N). The wireless interface unit $36_i$, the amplifier unit $37_i$, and the antenna $38_i$ may be configured as one set, or may be configured as two or more sets. That is, N in subscripts of i=1, 2, . . . , N is a positive number of 1 or more. In a case where the wireless interface unit $36_i$, the amplifier unit $37_i$, or the antenna $38_i$ (i=1, 2, . . . , N) does not have to be distinguished individually in particular, they will be simply referred to as the wireless interface unit 36, the amplifier unit 37, and the antenna unit 38. It is to be noted that one set of the wireless interface unit $36_i$, the amplifier unit $37_i$, and the antenna $38_i$ may be configured as one processing unit. The function of the amplifier unit $37_i$ may be included in the wireless interface unit $36_i$. The communication unit 22 is implemented by, for example, a large scale integration (LSI).

The communication unit 22A and the communication unit 22B may be independent components. Some components of the communication unit 22A and the communication unit 22B may be shared by the communication unit 22A and the communication unit 22B. For example, the data processing unit 31, the wireless controller 32, and the modulation and demodulation unit 33 may be shared by the communication unit 22A and the communication unit 22B. The communication unit 22A and the communication unit 22B are capable of controlling each other and exchanging information with each other.

The controller 21 includes, for example, a processor such as a microprocessor or the like and a circuit, and comprehensively controls operations of the entire communication device 10. For example, the controller 21 determines which one of the communication unit 22A or the communication unit 22B is used for communication, and gives an instruction to the communication unit 22A and the communication unit 22B. Specifically, the controller 21 controls communication to be conducted by using the communication unit 22A or the communication unit 22B, with which the transmission is determined to be completed earlier. Further, the controller 21 also controls the access method and the frequency band in the wireless communication conducted by the communication unit 22A and the communication unit 22B. Moreover, the controller 21 also controls the power supply unit 23. The controller 21 may be integrated with the wireless controllers 32 in the communication unit 22A and the communication unit 22B, or may perform at least a part of the functions of the wireless controllers 32 of the communication unit 22A and the communication unit 22B, instead of the wireless controllers 32. A wireless communication operation to be described below is performed under the control of the controller 21 and the wireless controller 32 of each communication unit 22.

The data processing unit 31 of the communication unit 22 generates a packet for wireless transmission of data to be input from an upper layer at the time of data transmission for transmitting the data, performs various data processes such as a process of adding a media access control (MAC) header that is a header for MAC, a process of adding an error detection code, and the like, and supplies the data that has been processed (a packet) to the modulation and demodulation unit 33.

Furthermore, the data processing unit 31 performs data processes, such as a MAC header analysis, packet error detection, and a reorder process, at the time of data reception, and supplies the data that has been processed to an upper layer.

The wireless controller 32 exchanges information between the respective units in the communication unit 22. For example, the wireless controller 32 makes parameter settings in the modulation and demodulation unit 33 and the signal processing unit 34, schedules packets in the data processing unit 31, makes parameter settings in the wireless interface unit $36_i$ and the amplifier unit $37_i$, and conducts transmission power control.

At the time of data transmission, the modulation and demodulation unit 33 encodes, interleaves, and modulates the data input from the data processing unit 31, on the basis of an encoding method and a modulation method that have been set by the wireless controller 32, so as to generate a data symbol stream, and supplies the data symbol stream to the signal processing unit 34.

Furthermore, at the time of data reception, the modulation and demodulation unit 33 performs reversed processes to the time of data transmission (decoding and demodulation) on the data input from the signal processing unit 34, and supplies the data that has been consequently obtained to the data processing unit 31 or the wireless controller 32.

At the time of data transmission, the signal processing unit 34 performs a signal process adapted to spatial separation on the data input from the modulation and demodulation unit 33 as necessary, and supplies one or more transmission symbol streams that have been obtained to wireless interface units $36_1$ to $36_N$.

Further, at the time of data reception, the signal processing unit 34 performs a signal process on the received symbol stream respectively input from the wireless interface units $36_1$ to $36_N$, performs spatial resolution on the stream as necessary, and supplies the data to the modulation and demodulation unit 33.

The channel estimation unit 35 calculates complex channel gain information of a propagation path from a preamble part and a training signal part of the input signals respectively from the wireless interface units $36_1$ to $36_N$. The complex channel gain information that has been calculated is used for a demodulation process in the modulation and demodulation unit 33 and a spatial process in the signal processing unit 34 through the wireless controller 32.

At the time of data transmission, the wireless interface unit $36_i$ converts the input data from the signal processing unit 34 into an analog signal, performs filtering, up-conversion to a carrier frequency, and phase control, and supplies the data to the amplifier unit $37_i$.

Furthermore, at the time of data reception, the wireless interface unit $36_i$ performs a reversed process to the time of data transmission on the input from the amplifier unit $37_i$, and supplies the data to the signal processing unit 34 and the channel estimation unit 35.

At the time of data transmission, the amplifier unit $37_i$ amplifies an analog signal that has been input from the wireless interface unit $36_i$ up to predetermined power, and supplies the power to the antenna $38_i$. The antenna $38_i$ transmits, as an electromagnetic wave, an analog signal supplied from the amplifier unit $37_i$.

Furthermore, at the time of data reception, the amplifier unit $37_i$ amplifies an analog signal that has been supplied from the antenna $38_i$ up to predetermined power, and supplies the power to the wireless interface unit $36_i$. The antenna $38_i$ receives a transmission signal transmitted as an electromagnetic wave from another communication device 10, and supplies the reception signal to the amplifier unit $37_i$.

The amplifier unit $37_i$ may include at least one of a function at the time of data transmission or a function at the time of data reception in the wireless interface unit $36_i$. Further, in a case where both the function at the time of data transmission and the function at the time of data reception are included in the wireless interface unit $36_i$, the communication unit 22 is configured without the amplifier unit $37_i$. At least a part of at least one of the function at the time of transmission or the function at the time of reception of the amplifier unit $37_i$ may be a component outside the communication unit 22.

The power supply unit 23 includes a battery power source or a fixed power source, and supplies electric power to the respective units in the communication device 10.

The communication device 10 that operates as the base station AP or the slave station STA in FIG. 1 is configured as described above. In the following description, when it is not particularly distinguished whether it is a base station AP or a slave station STA, they will be referred to as a communication device 10.

3. First Communication Process Example

The base station AP and the slave station STA use a plurality of unlicensed bands to conduct communication in the random access method on at least one band, and conduct communication in the scheduled access method on another at least one band. The slave station STA is capable of conducting communication using a resource that has been allocated to the slave station STA on a band in the scheduled access method, in a case where the delay time is predicted to exceed a certain threshold value on a band using the random access method. It is to be noted that the resource include a time resource related to time, a frequency resource related to frequency, a spatial stream resource related to spatial stream, and a non-orthogonal multiplex access resource related to non-orthogonal multiplex access. However, in the following description, in particular, an example of allocating the time resource to conduct communication will be given.

(Process Sequence of First Communication Process)

Figure 3:
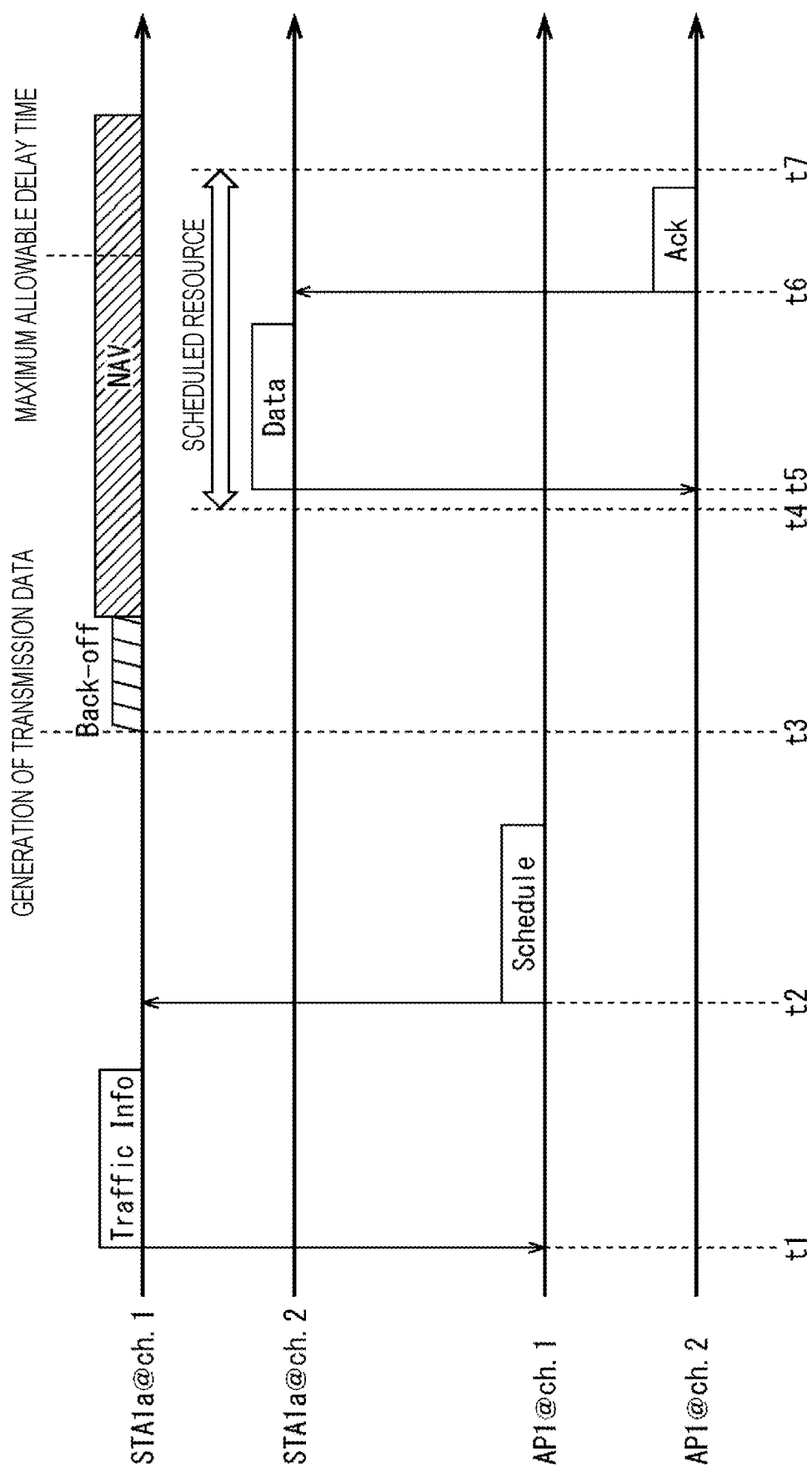
FIG. 3 is a diagram for describing a first communication process.

With reference to FIG. 3, as an example of communication between the slave station STA1a and the base station AP1, a communication process (a first communication process) using two unlicensed bands and two access methods will be described.

Ch.1 in FIG. 3 is a frequency band (hereinafter, also referred to as a first frequency band) in which communication is conducted using the random access method. Ch.2 is a frequency band different from Ch.1, and is a frequency band (hereinafter, also referred to as a second frequency band) in which communication is conducted using the scheduled access method.

First, at time t1, the slave station STA1a notifies the base station AP1 of information (Traffic Info) regarding traffic that the slave station STA1a handles in the random access method using the first frequency band. The information regarding the traffic is information including characteristics of data transmitted and received between the slave station STA1a and the base station AP1, and includes any of, for example, information regarding a maximum allowable delay time of the data to be transmitted, information regarding a priority of the data to be transmitted, and information regarding a data amount, and information regarding a data generation frequency. The information regarding the maximum allowable delay time of the data may be determined by an application running on an upper layer. For example, the upper layer is an application that handles moving images. In such an application, the maximum allowable delay time of the data is determined on the basis of the time necessary for generating or selecting a frame, and is designated for the slave station STA1a. In addition, for example, information regarding the maximum allowable delay time of the data may be determined on the basis of a demanded transmission frequency of a control signal for controlling a mechanical operation of a device.

The notification of the information regarding the traffic may be transmitted as a signal for notifying the information, may be transmitted as a part of a signal for establishing a connection, or may be transmitted as a part of a signal for transmitting data. Further, the notification of the information regarding the traffic may be transmitted in response to a request from the base station AP1. The notification of the information regarding the traffic may be transmitted on any of the first frequency band or the second frequency band.

At time t2, the base station AP1 that has received the information regarding the traffic from the slave station STA1a determines a time resource for the slave station STA1a on the second frequency band on the basis of the information regarding the traffic that has been received (allocates the time resource). The time resource can be determined on the basis of the maximum allowable delay time of the data that has been received as the information regarding the traffic. Such a determination enables the slave station STA1a to complete data transmission within the maximum allowable delay time.

Then, after the time resource is determined, the base station AP1 notifies the slave station STA1a of the information regarding the resource (Schedule). The information regarding the resource includes at least information regarding a time resource. The information regarding the time resource includes, for example, information regarding a start time of the time resource, information regarding a period of the time resource, and the like.

In addition, the information regarding the resource may include information regarding a frequency resource. For example, the information regarding the frequency resource can include information regarding a center frequency and a frequency bandwidth. Further, the information regarding the resource may include information regarding a spatial stream resource, and may include, for example, information that identifies a spatial stream.

Further, the information regarding the resource may include information regarding a non-orthogonal multiplex access resource, such as information regarding transmission power and information regarding an interleave pattern. The fact that the information regarding the resource is same with the resource that has been allocated in the past may be notified. Further, the fact that the slave station STA1a has no resource allocation on the second frequency band may be notified as the information regarding the resource.

The notification of the information regarding the resource may be transmitted as a signal for notifying the information regarding the resource, may be transmitted as a part of a signal for establishing a connection, or may be transmitted as a part of a signal that is transmitted periodically, such as a beacon frame, or may be transmitted as a part of a signal for transmitting data. The notification of the information regarding the resource may be transmitted as a unicast addressed to the slave station STA1a, or may be transmitted to a plurality of communication devices 10 belonging to a group including the slave station STA1a (a group address), or may be transmitted by broadcast (to a broadcast address) without designating the communication device 10. The notification of the information regarding the resource may be transmitted in response to the notification of the information regarding the traffic that has been notified from the slave station STA1a. The notification of the information regarding the resource may be transmitted on any of the first frequency band or the second frequency band, may be transmitted on the same frequency band with the frequency band on which the notification of the information regarding the traffic has been notified from the slave station STA1a, or may be transmitted on a different frequency band.

It is assumed that at time t3, the transmission data is supplied to the slave station STA1a from an upper layer of the slave station STA1a. That is, in a case where the transmission data is generated in the slave station STA1a at the time t3, the slave station STA1a attempts to obtain a transmission opportunity on the basis of a collision avoidance mechanism on the first frequency band. For the collision avoidance mechanism, for example, a mechanism based on the back-off process (Back-off) in the IEEE 802.11 standard can be adopted.

While attempting to obtain a transmission opportunity, in a case where the slave station STA1a detects communication by another communication device 10 (for example, the slave station STA1b), the slave station STA1a suspends attempting to obtain the transmission opportunity. At this time, the slave station STA1a calculates a period for keeping suspension (suspension keeping period). The suspension keeping period is calculated on the basis of information regarding a signal included in the communication by another communication device 10 in communication. In a case where the information cannot be obtained from another communication device 10 in communication, the slave station STA1a sets, for example, a predetermined period that has been determined beforehand, as the suspension keeping period. For example, a transmission prohibition time called network allocation vector (NAV) can be set as the suspension keeping period.

As a result of calculating the suspension keeping period, in a case where it is assumed that the time until the transmission of the transmission data is completed exceeds the above-described maximum allowable delay time of the data, the slave station STA1a transmits the data using the time resource that has been allocated to the slave station STA1a on the second frequency band. For example, in a case where the time resource that has been allocated to the slave station STA1a on the second frequency band is a period from time t4 to time t7, the slave station STA1a transmits the transmission data to the base station AP1 on the second frequency band at time t5 later than the time t4.

The period of time until the transmission of the transmission data is completed can be determined on the basis of, for example, a state of obtaining the transmission opportunity that has been suspended, a length of a transmission signal including the transmission data, a length of a response signal (Ack) transmitted from the base station AP1, a period of the time until the response signal is transmitted, and the like.

In transmitting data on the second frequency band, the slave station STA1a may carry out carrier sense before transmission to confirm that no other communication is being conducted.

The base station AP1 that has received the data from the slave station STA1a on the second frequency band transmits a response signal (Ack) to the slave station STA1a at time t6 on the basis of a reception result.

In the above-described example, the slave station STA1a transmits the data from itself using the time resource allocated to itself. However, the slave station STA1a may transmit the data on the basis of a signal for inducing transmission (a transmission induced signal) from the base station AP1. In such a case, the base station AP1 transmits the transmission induced signal to the slave station STA1a at a timing of the time resource that has been allocated to the slave station STA1a, and then the slave station STA1a transmits the data on the basis of the transmission induced signal. In addition, in a case where the time resource with which the transmission can be completed is allocated before the case of obtaining a transmission opportunity to transmit the data on the first frequency band, the slave station STA1a is capable of transmitting the data using the time resource on the second frequency band without attempting to obtain the transmission opportunity on the first frequency band. This configuration enables minimization of the delay time.

A plurality of time resource allocations can be set for the slave station STA1a on the second frequency band. Another time resource may be determined to be at an earlier time or at a later time than a single time resource. In a case where a plurality of time resources is set, the respective time resources are set in a similar manner to the case of allocating a single time resource as described above. That is, at time t2, the information regarding the resource (Schedule) notified to the slave station STA1a by the base station AP1 includes information regarding time resource about a plurality of time resources. For example, each time resource includes the above-described information regarding the start time of the time resource, the information regarding the period of the time resource, and the like. In addition, each time resource may include information regarding cycles of a plurality of time resources (intervals between the plurality of time resources) and information regarding the number of time resources. The information regarding the resource may include information regarding the frequency resource in each time resource, information regarding the spatial stream resource, information regarding the non-orthogonal multiplex access resource, and the like. The information regarding the resource may include a same frequency resource, a spatial stream resource, or a non-orthogonal multiplex access resource, in the plurality of time resources.

The slave station STA1a selects a time resource capable of satisfying a request for the maximum allowable delay time from the plurality of time resources that has been allocated, and transmits the data. In particular, in a case of selecting a time resource at an earliest time from the plurality of time resources that has been allocated and transmitting the data, the delay time can be shortened while ensuring the maximum allowable delay time.

In a case where the slave station STA1a that has completed the transmission using the resource on either the first frequency band or the second frequency band has remaining time resources allocated to itself on the second frequency band after the completion of transmission, the slave station STA1a is capable of notifying the base station AP1 of information indicating that such time resources are no longer necessary by unicast or broadcast. With such a configuration, the time resources on the second frequency band that are no longer necessary can be used for other communications.

In a case where a plurality of slave stations STA1, which are communication counterparts of the base station AP1, is present, the time resources on the second frequency band can be allocated to the respective slave stations STA1. The resources allocated to the respective slave stations STA1 can be determined so that any one of the time resource, the frequency resource, the spatial stream resource, and the non-orthogonal multiplex access resource is orthogonal, and the same resources are not allocated. Such a determination enables prevention of the communications between the plurality of slave stations STA1 from colliding with each other. Further, the same resource may be allocated to a part of the plurality of slave stations STA1. With such a configuration, in a case where a part of the slave station STA1 to which the time resource has been allocated on the second frequency band completes transmission on the first frequency band, another slave station STA1 to which the same time resource has been allocated is capable of conducting communication using a free time resource. Therefore, the communication efficiency can be prevented from being lowered due to an unused time resource on the second frequency band.

In addition, in a case where a comprehensive control communication device that comprehensively controls the slave station STA1a and the base station AP1 is present, the slave station STA1a may notify the information regarding the traffic handled by the slave station STA1a to the comprehensive control communication device. In such a case, the comprehensive control communication device determines the allocation of the resource including the time resource of the slave station STA1a, in place of the base station AP1, and notifies the slave station STA1a of the information regarding the resource.

Prior to the sequence shown in FIG. 3, the slave station STA1a and the base station AP1 are capable of performing a process of mutually confirming whether communication on the first frequency band and the second frequency band is available, and a process of establishing connection on either on the first frequency band or the second frequency band. Further, prior to the sequence of FIG. 3, the slave station STA1a and the base station AP1 are capable of performing a process of mutually confirming whether a function corresponding to the above-described allocation of the time resource is provided.

(Transmission Process of Slave Station STA1a)

Figure 4:
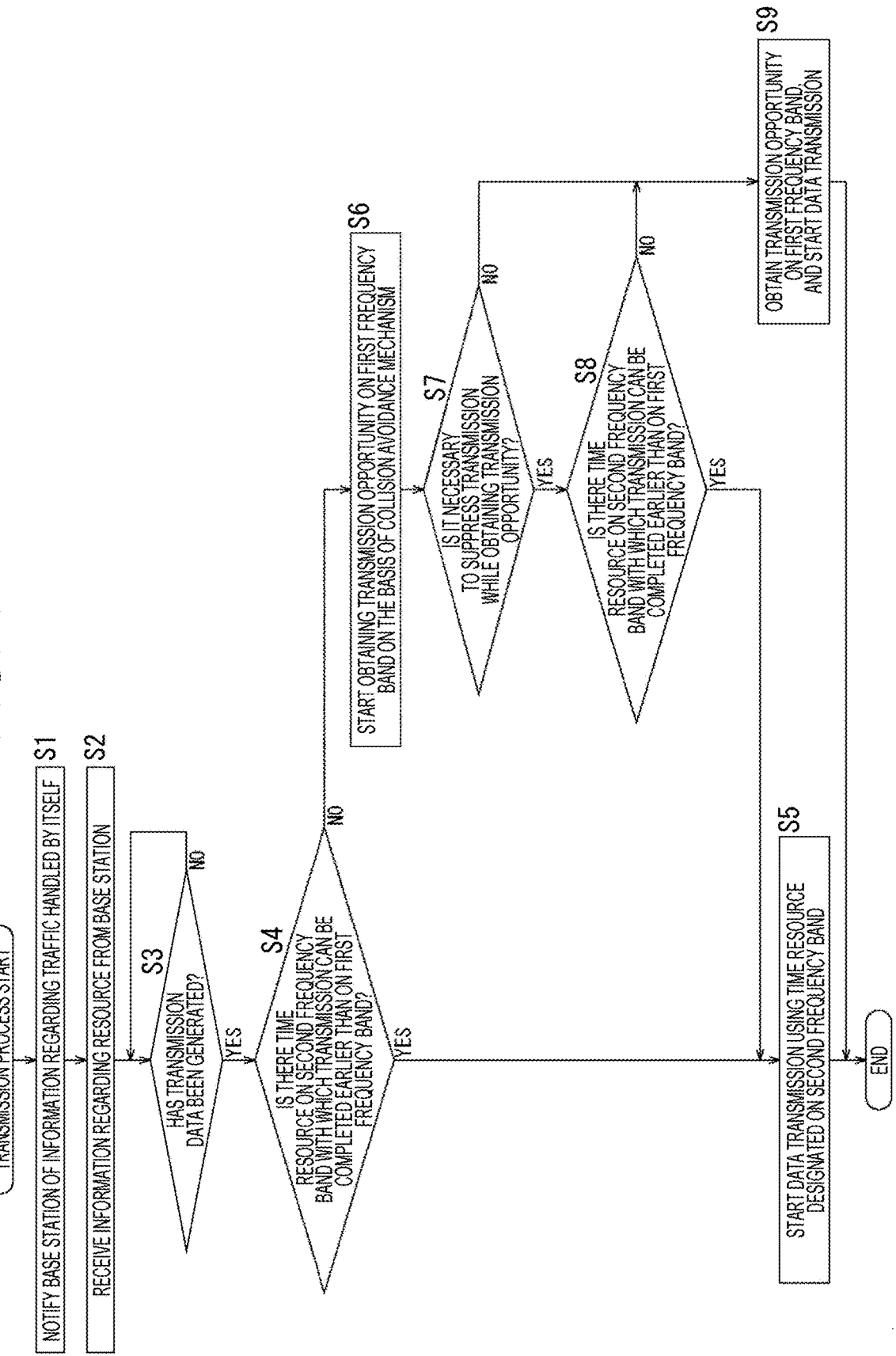
FIG. 4 is a flowchart for describing a transmission process of the slave station STA in the first communication process.

FIG. 4 is a flowchart illustrating a transmission process of the slave station STA1a, which is a data transmitting side, in the sequence described in FIG. 3.

First, in step S1, the slave station STA1a notifies the base station AP1 of the information (Traffic Info) regarding the traffic handled by the slave station STA1a.

After notifying the information regarding the traffic, the slave station STA1a receives the information regarding the resource transmitted from the base station AP1, in step S2.

In step S3, the slave station STA1a determines whether transmission data has been generated, that is, whether the transmission data has been supplied to the slave station STA1a from an upper layer. Then, the process of step S3 is repeated until it is determined that the transmission data has been generated. In a case where it is determined that the transmission data has been generated, the process proceeds to step S4.

In step S4, the slave station STA1a determines whether there is an allocation of a time resource on the second frequency band with which the transmission can be completed earlier than obtaining a transmission opportunity and making transmission on the first frequency band.

In a case where it is determined in step S4 that there is an allocation of the time resource with which the transmission can be completed earlier on the second frequency band, the process proceeds to step S5. The slave station STA1a starts transmitting the data using the time resource designated on the second frequency band. After the data transmission is completed, the transmission process of FIG. 4 ends.

On the other hand, in a case where it is determined in step S4 that there is no time resource allocation with which the transmission can be completed earlier on the second frequency band, the process proceeds to step S6. The slave station STA1a starts obtaining a transmission opportunity on the basis of a collision avoidance mechanism on the first frequency band.

After step S6, in step S7, while obtaining the transmission opportunity on the first frequency band, the slave station STA1a determines whether it is necessary to suppress the transmission, in other words, whether communication conducted by another communication device 10 (for example, the slave station STA1b) has been detected.

In a case where it is determined in step S7 that it is necessary to suppress the transmission, the process proceeds to step S8. The slave station STA1a determines whether there is an allocation of a time resource on the second frequency band with which the transmission can be completed earlier than obtaining a transmission opportunity and making transmission on the first frequency band.

In a case where it is determined in step S8 that there is the allocation of the time resource with which the transmission can be completed earlier on the second frequency band, the process proceeds to step S5 described above. In step S5, the slave station STA1a starts transmitting the data using the time resource designated on the second frequency band.

On the other hand, in a case where it is determined in step S7 that it is not necessary to suppress the transmission, or in a case where it is determined in step S8 that there is no allocation of the time resource with which the transmission can be completed earlier on the second frequency band, the process proceeds to step S9. In step S9, the slave station STA1a obtains a transmission opportunity on the first frequency band on the basis of the collision avoidance mechanism, and starts transmitting the data. After the data transmission is completed, the transmission process of FIG. 4 ends.

According to the above transmission process, the slave station STA1a transmits the data using the frequency band with which the transmission can be completed earlier, out of the first frequency band and the second frequency band.

(Reception Process of Base Station AP1)

Figure 5:
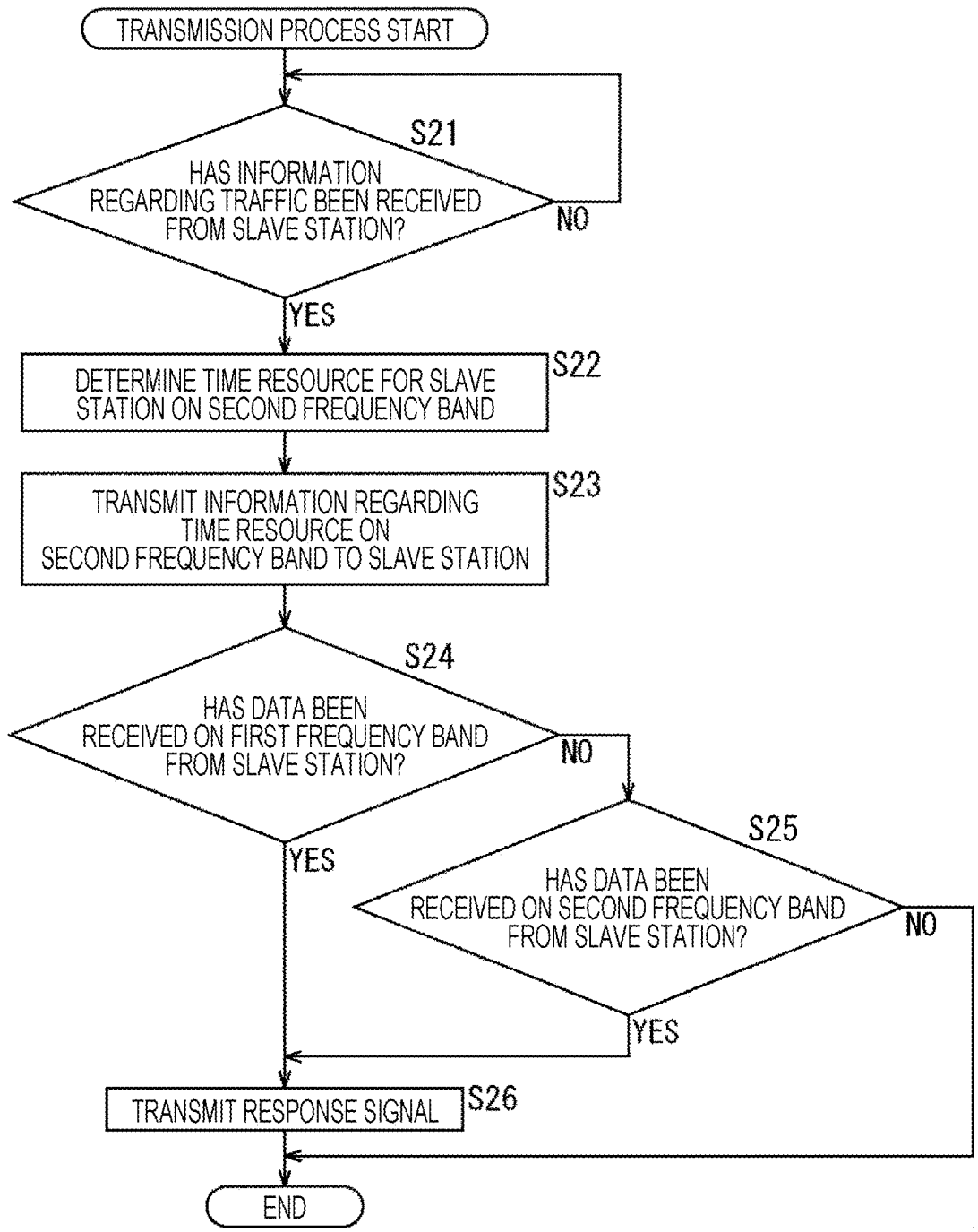
FIG. 5 is a flowchart for describing a reception process of the base station AP in the first communication process.

FIG. 5 is a flowchart illustrating a reception process of the base station AP1, which is a data receiving side in the sequence of FIG. 3.

First, in step S21, the base station AP1 determines whether the information regarding the traffic has been received from the slave station STA1a, and waits until it is determined that the information regarding the traffic has been received.

In a case where it is determined in step S21 that the information regarding the traffic has been received, the process proceeds to step S22. The base station AP1 obtains the received information regarding the traffic. Then, the base station AP1 determines a time resource for the slave station STA1a on the second frequency band on the basis of the information regarding the traffic that has been obtained (allocates a time resource).

In step S23, the base station AP1 notifies the slave station STA1a of information regarding the resource. The information regarding the resource includes at least the information regarding the time resource of the slave station STA1a on the second frequency band.

In step S24, the base station AP1 determines whether the data has been received from the slave station STA1a on the first frequency band. In a case where it is determined in step S24 that the data has been received from the slave station STA1a on the first frequency band, the process proceeds to step S26, as will be described later.

On the other hand, in a case where it is determined in step S24 that no data has been received from the slave station STA1a on the first frequency band, the process proceeds to step S25. The base station AP1 determines whether the data has been received from the slave station STA1a on the second frequency band.

In a case where it is determined in step S25 that the data has been received from the slave station STA1a on the second frequency band, the process proceeds to step S26. The base station AP1 transmits a response signal (Ack) to the slave station STA1a. Therefore, in a case where the data has been received on either the first frequency band or the second frequency band, the response signal (Ack) is transmitted to the slave station STA1a, and the reception process of FIG. 5 ends.

On the other hand, also in a case where it is determined in step S25 that no data has been received from the slave station STA1a on the second frequency band, the reception process of FIG. 5 ends.

FIG. 6 shows an example of a signal format of information (Traffic Info) regarding traffic to be transmitted from the slave station STA1a to the base station AP1.

Signal Type includes information indicating that this signal is a signal for notifying information regarding traffic. Length includes information regarding the length of this signal. Maximum Acceptable Delay includes information regarding the maximum acceptable delay time for the data to be transmitted. Priority includes information regarding the priority of the data to be transmitted. Data Amount includes information regarding the data amount. Frequency of Data includes information regarding the generation frequency of the data.

FIG. 7 shows an example of a signal format of information regarding a resource to be transmitted from the base station AP1 to the slave station STA1a.

Signal Type includes information indicating that this signal is a signal for notifying information regarding a resource. Length includes information regarding the length of this signal.

Allocated ID includes information regarding an identifier of a communication device (in the present example, the slave station STA1a) to which the resource is allocated.

Time Resource includes information regarding a time resource. Frequency Resource includes information regarding a frequency resource.

Spatial Stream Resource includes information regarding a spatial stream resource. NOMA Resource includes information regarding a non-orthogonal multiplex access resource.

Inherit Resource includes information indicating that the same resource with the resource that has been allocated in the past is used.

No Allocation includes information indicating that there is no resource allocation.

4. Second Communication Process Example

Next, a second communication process example will be described.

In the second communication process example described below, in a similar manner to the first communication process example, a predetermined time resource on the second frequency band is allocated to the slave station STA1a. However, in a case where it is determined that a time resource on the second frequency band that has been allocated to the slave station STA1a is not used, the slave station STA1a conducts communication with another communication device 10 by using such a time resource.

The description will be given with regard to an example in which the base station AP2 and the slave station STA2 communicate with each other, as other communication devices 10 that conduct communication by using an unused time resource that has been allocated to the slave station STA1a.

Process Sequence of Second Communication Process

Figure 8:
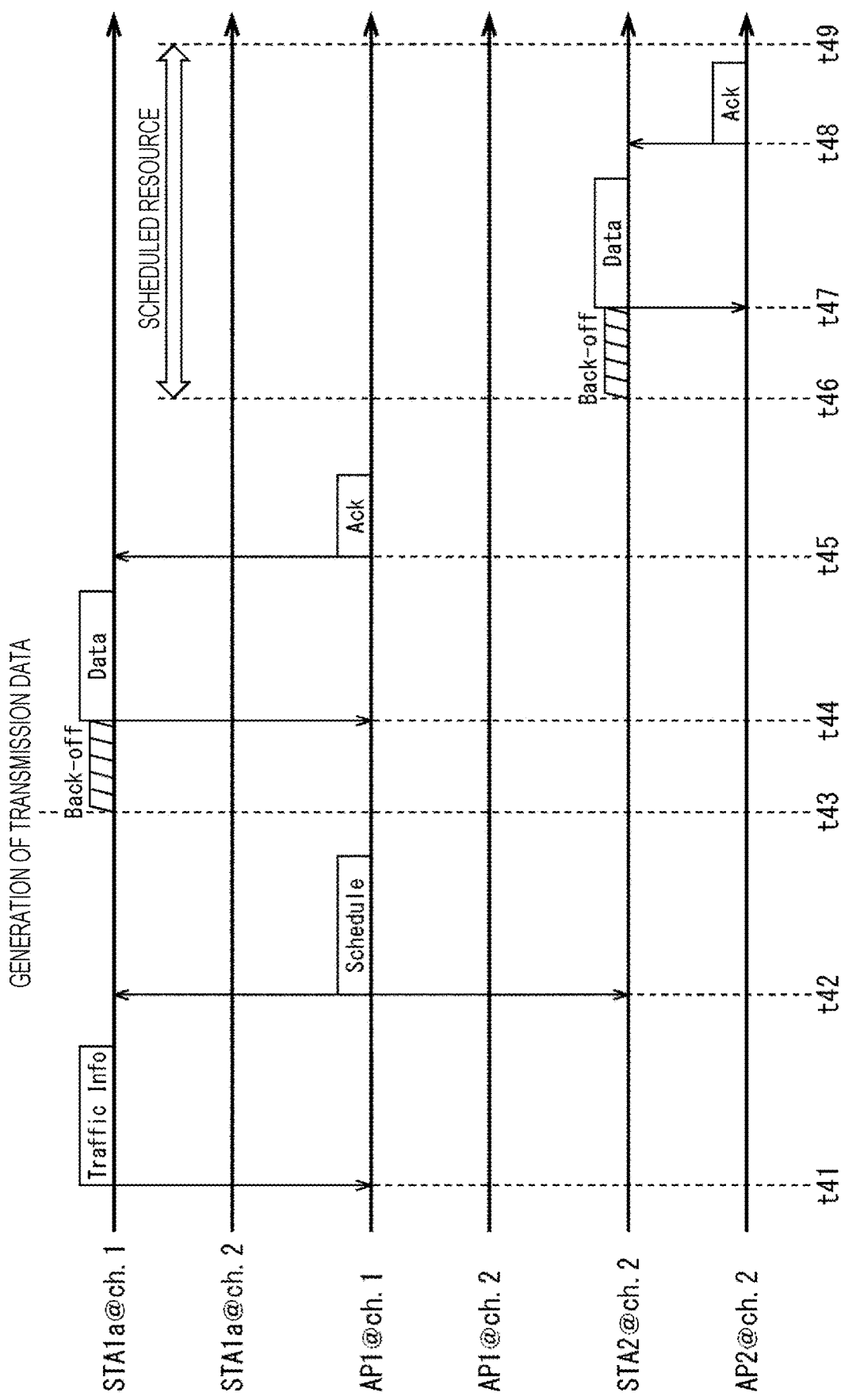
FIG. 8 is a diagram for describing a second communication process.

With reference to FIG. 8, a second communication process performed by the base station AP1 and the slave station STA1a and by the base station AP2 and the slave station STA2 will be described. It is to be noted that in the second communication process, the operations of the parts that will not be described below are similar to those in the first communication process described above.

Ch.1 and Ch.2 in FIG. 8 are similar to those in FIG. 3. That is, Ch.1 is a frequency band (the first frequency band) on which communication is conducted between the base station AP1 and the slave station STA1a using the random access method. Ch.2 is a frequency band different from Ch.1 and is a frequency band (the second frequency band) on which communication is conducted between the base station AP1 and the slave station STA1a using the scheduled access method.

First, at time t41, the slave station STA1a notifies the base station AP1 of information (Traffic Info) regarding the traffic that the slave station STA1a handles in the random access method using the first frequency band.

The base station AP1 that has received the information regarding the traffic from the slave station STA1a determines a time resource for the slave station STA1a on the second frequency band at time t42 on the basis of the information regarding the traffic that has been received (allocates a time resource).

Then, after the time resource is determined, the base station AP1 notifies the slave station STA1a of the information regarding the resource (Schedule). In this situation, the base station AP1 makes transmission to a plurality of slave stations STA belonging to a group including the slave station STA1a (a group address), or makes transmission by broadcast without designating the communication device 10 (to a broadcast address). The group address or the broadcast address includes at least the slave station STA2, to which no time resource on the second frequency band is allocated. Therefore, the slave station STA2 is also capable of learning the information regarding the time resource on the second frequency band that has been allocated to the slave station STA1*a*.

The information regarding the resource transmitted from the base station AP1 may include information indicating that the communication device 10 (for example, the slave station STA2), to which no time resource on the second frequency band is allocated, may conduct communication by using at least any of the time resources that have been allocated to another communication device 10. Further, the information regarding the resource may include information regarding a communication method of a case where the communication device 10 to which no time resource is allocated conducts communication. The information regarding such a communication method includes, for example, information regarding a method for obtaining a transmission opportunity. The information regarding the method for obtaining the transmission opportunity can include, for example, information regarding the collision avoidance mechanism and information regarding a minimum waiting time until the start of transmission. Further, the information regarding the collision avoidance mechanism includes, for example, information regarding whether the collision avoidance mechanism is implemented, information regarding a parameter used in the collision avoidance mechanism, and the like.

It is assumed that at time t43, transmission data is supplied to the slave station STA1*a* from an upper layer of the slave station STA1*a*. That is, in a case where the transmission data is generated in the slave station STA1*a* at time t43, the slave station STA1*a* attempts to obtain a transmission opportunity on the first frequency band on the basis of the collision avoidance mechanism. Then, the slave station STA1*a* obtains the transmission opportunity, and at time 44, transmits the transmission data (Data) to the base station AP1 on the first frequency band. The base station AP1 receives the data from the slave station STA1*a* on the first frequency band, and at time t45, transmits a response signal (Ack) to the slave station STA1*a* on the basis of a reception result.

The slave station STA1*a* has transmitted the data on the first frequency band. This generates a state in which the time resource on the second frequency band that has been allocated to the slave station STA1*a*, specifically, a period from time t46 to time t49 is not used. The slave station STA1*a* may transmit information indicating that the time resource on the second frequency band that has been allocated to the slave station STA1*a* is no longer necessary to a plurality of communication devices 10 belonging to a group or by broadcast.

At time t46, the slave station STA2 determines that no other communication is being conducted in the time resource on the second frequency band that has been allocated to the slave station STA1*a*, and obtains a transmission opportunity. The determination that no other communication is being conducted in the time resource on the second frequency band that has been allocated to the slave station STA1*a* is made on the basis of the information regarding the resource that has been notified by the base station AP1 or the information indicating that the resource is no longer necessary that has been notified by the slave station STA1*a*. Alternatively, the determination may be made by detecting that no other communication is being conducted on the basis of the carrier sense. The transmission opportunity can be obtained according to the information, included in the information regarding the resource, regarding the method for obtaining the transmission opportunity of a case where the communication device 10 to which no resource is allocated conducts communication.

The slave station STA2 that has obtained the transmission opportunity conducts communication within a time resource from time t46 to time t49. That is, the communication is adjusted so that the length of the transmission signal, the length of the response signal to the transmission signal, and the time until the response signal is transmitted do not exceed the period from time t46 to time t49, and is then conducted. At time t47, the slave station STA2 transmits data to the base station AP2 on the second frequency band. The base station AP2 receives the data from the slave station STA2, and at time t48, transmits a response signal (Ack) to the slave station STA2. The time until the slave station STA2 receives the response signal is adjusted not to exceed time t49.

In a case where a remaining time resource after the data has been transmitted once is longer than a period of time for completing transmission of the next data, in other words, in a case where a total period of the time to obtain a transmission opportunity of a case of transmitting the next data, the length of a transmission signal, the length of a response signal to the transmission signal, and a period of time until the response signal is transmitted is shorter than a remaining period of time of the time resource, the slave station STA2 may obtain a new transmission opportunity.

It is to be noted that in the example shown in FIG. 8, the description has been given with regard to the other communication devices 10, which use the time resource on the second frequency band that is not used by the slave station STA1*a*, and which include the base station AP2 and the slave station STA2 belonging to a different BSS from that of the slave station STA1*a*.

However, the other communication devices 10, which use the time resource on the second frequency band that is not used by the slave station STA1*a* may include the slave station STA1*b* belonging to the same BSS with the slave station STA1*a*. In this case, the process of the slave station STA2 that has been described with reference to FIG. 8 is a process performed by the slave station STA1*b*, and the process of the base station AP2 is a process performed by the base station AP1.

(Reception Process of Base Station AP1)

Figure 9:
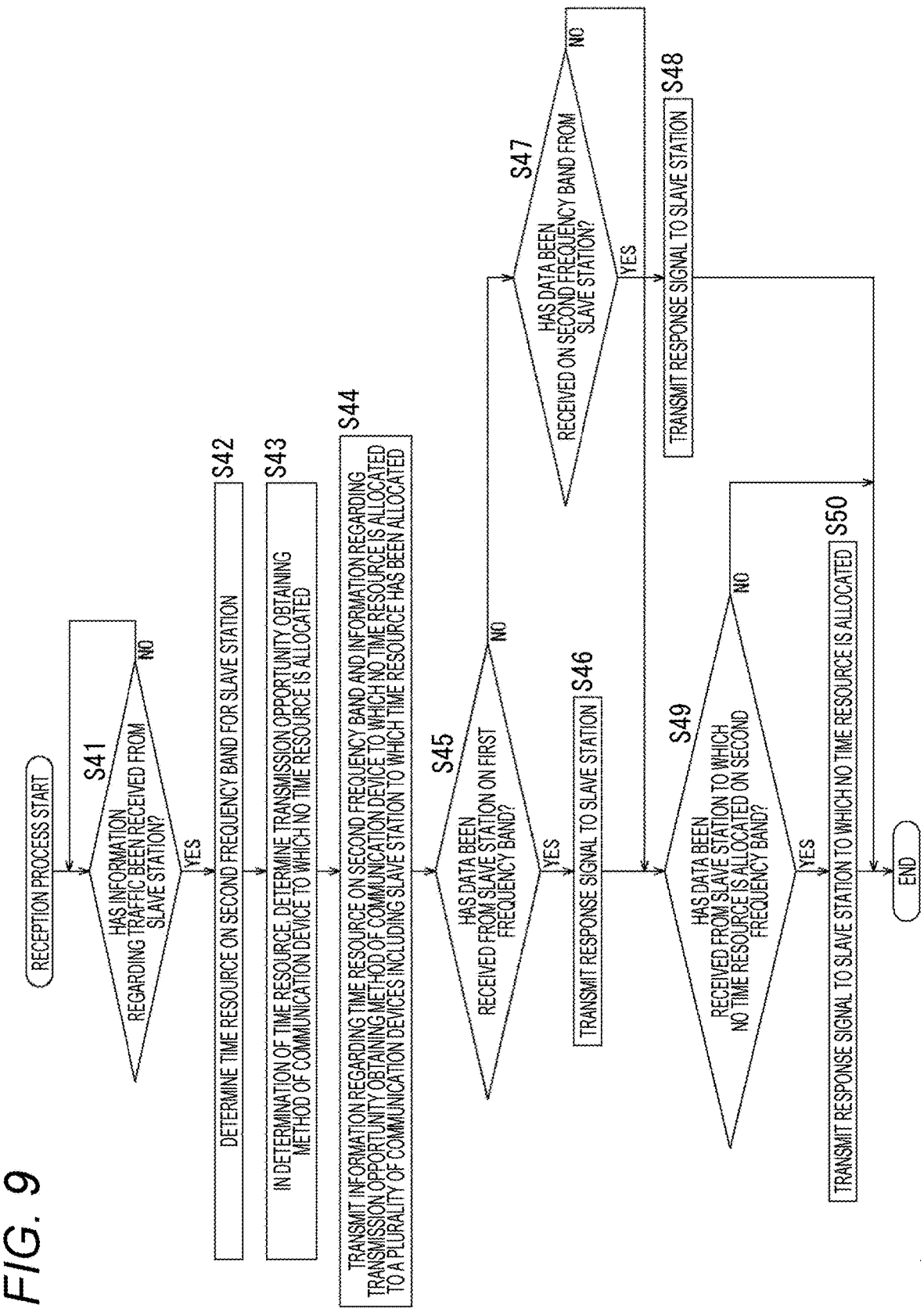
FIG. 9 is a flowchart illustrating a reception process of the base station AP in the second communication process.

FIG. 9 is a flowchart for describing a reception process of the base station AP1 in the sequences described in FIG. 8.

It is to be noted that the reception process by the base station AP1 in FIG. 9 also includes a process of a case where the slave station STA1*b* in the same BSS with the slave station STA1*a* uses the time resource on the second frequency band that is not used by the slave station STA1*a*.

First, in step S41, the base station AP1 determines whether the information regarding the traffic has been received from the slave station STA1*a*, and waits until it is determined that the information regarding the traffic has been received.

In a case where it is determined in step S41 that the information regarding the traffic has been received, the process proceeds to step S42. The base station AP1 determines the time resource of the slave station STA1*a* on the second frequency band on the basis of the information regarding the traffic that has been received (allocates a time resource).

In step S43, the base station AP1 determines a method for obtaining a transmission opportunity of a case where the communication device 10 to which no time resource is allocated on the second frequency band conducts communication.

In step S44, the base station AP1 notifies a plurality of communication devices 10 of the information regarding the resource. The plurality of communication devices 10 (for example, the slave station STA1b, the base station AP2, and the slave station STA2) includes the slave station STA1a to which the time resource on the second frequency band has been allocated. The information regarding the resource includes at least information regarding a time resource of the slave station STA1a on the second frequency band and information regarding the method for obtaining a transmission opportunity of a case where the communication device 10 to which no time resource on the second frequency band is allocated conducts communication.

In step S45, the base station AP1 determines whether the data has been received from the slave station STA1a on the first frequency band. In a case where it is determined in step S45 that the data has been received from the slave station STA1a on the first frequency band, the process proceeds to step S46. In step S46, the base station AP1 obtains the received data, and transmits a response signal (Ack) to the slave station STA1a. After step S46, the process proceeds to step S49.

On the other hand, in a case where it is determined in step S45 that no data has been received from the slave station STA1a on the first frequency band, the process proceeds to step S47. The base station AP1 determines whether the data has been received from the slave station STA1a on the second frequency band. In a case where it is determined in step S47 that the data has been received from the slave station STA1a on the second frequency band, the process proceeds to step S48. The base station AP1 obtains the received data, and transmits a response signal (Ack) to the slave station STA1a, and the reception process shown in FIG. 9 ends.

On the other hand, in a case where it is determined in step S47 that no data has been received from the slave station STA1a on the second frequency band, the process proceeds to step S49. The base station AP1 determines whether the data has been received from the slave station STA1b to which no time resource is allocated on the second frequency band. The case where the data has been received from the slave station STA1b means a case where the time resource on the second frequency band that has been allocated to the slave station STA1a is not used, and the slave station STA1b belonging to the same BSS has transmitted the data using such a free time resource.

In a case where it is determined in step S49 that the data has been received from the slave station STA1b to which no time resource is allocated on the second frequency band, the process proceeds to step S50. The base station AP1 obtains the received data, transmits a response signal (Ack) to the slave station STA1b to which no time resource is allocated, and the reception process shown in FIG. 9 ends.

On the other hand, in a case where it is determined in step S49 that no data has been received from the slave station STA1b to which no time resource is allocated on the second frequency band, the reception process of FIG. 9 ends.

(Transmission Process by Another Communication Device 10)

Figure 10:
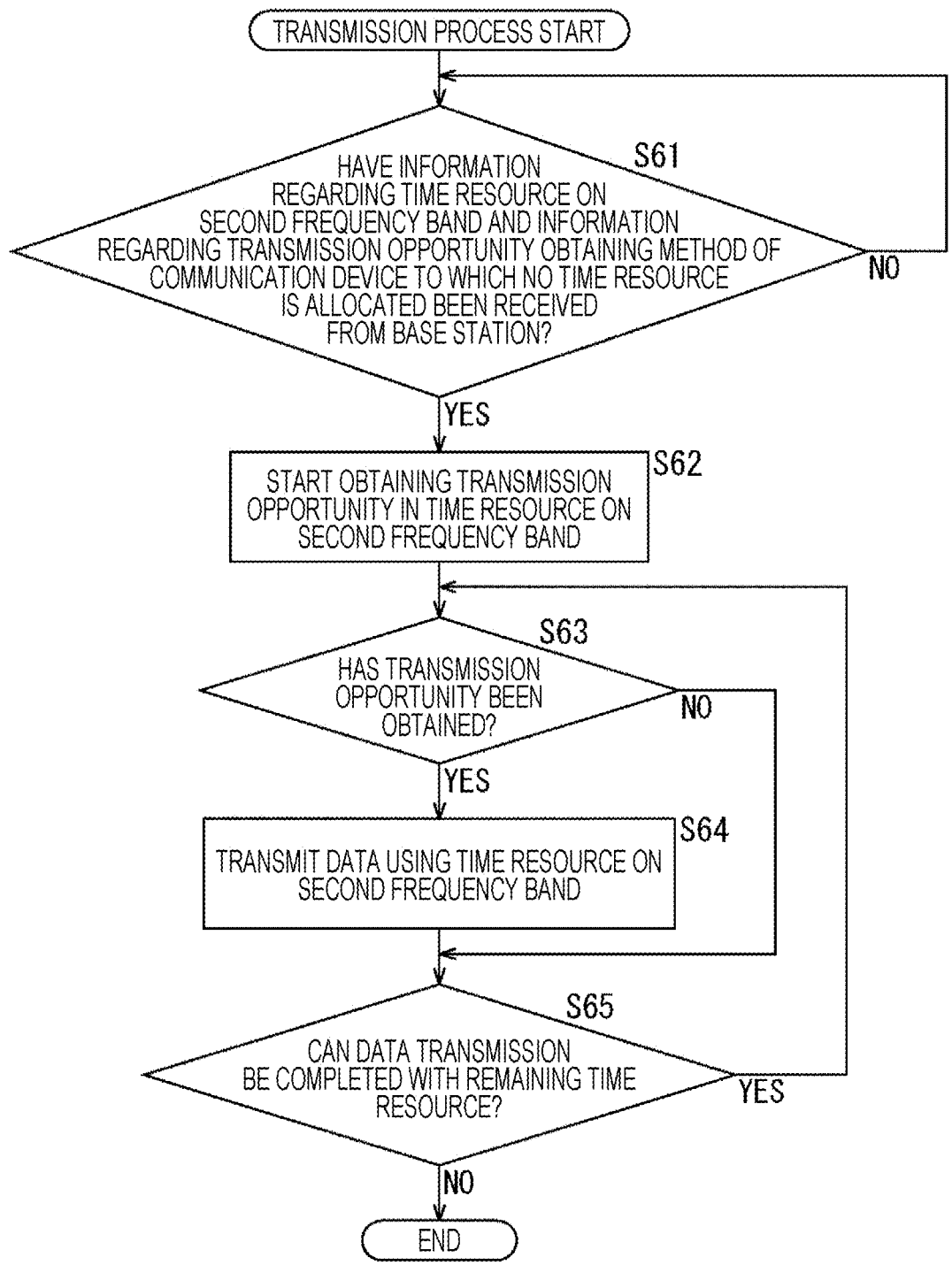
FIG. 10 is a flowchart for describing a transmission process by a communication device having no time resource in the second communication process.

FIG. 10 is a flowchart showing a transmission process by the communication device 10 to which no time resource on the second frequency band is allocated in the sequence described in FIG. 8. The example of FIG. 8 corresponds to a process of the slave station STA2, and the flowchart of FIG. 9 corresponds to a process of the slave station STA1b. The following description will be given as the process of the slave station STA1b.

First, in step S61, the slave station STA1b determines whether the information regarding the resource has been received from the base station AP1. The information regarding the resource includes at least information regarding a time resource of the slave station STA1a on the second frequency band and information regarding the method for obtaining a transmission opportunity of a case where the communication device 10 to which no time resource on the second frequency band is allocated conducts communication. The process of step S61 is repeated until it is determined that the information regarding the resource has been received from the base station AP1, and in a case where it is determined in step S61 that the information regarding the resource has been received from the base station AP1, the process proceeds to step S62.

In step S62, the slave station STA1b determines that no other communication is being conducted in the time resource on the second frequency band that has been allocated to the slave station STA1a, starts obtaining a transmission opportunity, and proceeds the process to step S63.

In step S63, the slave station STA1b determines whether the transmission opportunity has been obtained. In a case where it is determined in step S63 that the transmission opportunity has not been obtained, the process proceeds to step S65. On the other hand, in a case where it is determined in step S63 that the transmission opportunity has been obtained, the process proceeds to step S64. The slave station STA1b transmits the data to the base station AP1 using the time resource on the second frequency band that has been allocated to the slave station STA1a, and proceeds the process to step S65.

In step S65, the slave station STA1b determines whether the next data transmission can be completed with a remaining time resource on the second frequency band.

In a case where it is determined in step S65 that the next data transmission can be completed with the remaining time resource on the second frequency band, the process returns to step S63. The slave station STA1b performs the above-mentioned steps S63 to S65 again. That is, the slave station STA1b attempts to obtain a transmission opportunity with the remaining time resource, and transmits the next data to the base station AP1.

On the other hand, in a case where it is determined in step S65 that the next data transmission cannot be completed with the remaining time resource on the second frequency band, the transmission process of FIG. 10 ends.

FIG. 11 shows an example of a signal format of information regarding a resource transmitted from the base station AP1 to a plurality of communication devices 10 including the slave station STA1a, in the second communication process.

Signal Type includes information indicating that this signal is a signal for notifying information regarding a resource.

Length includes information regarding the length of this signal.

Non-allocated Transmission includes information indicating that the communication device 10 to which no resource is allocated may conduct communication.

Obtaining Transmission Opportunity includes information regarding a method for obtaining a transmission opportunity of a case where the communication device 10 to which no source is allocated conducts communication.

It is to be noted that in the notification of the information regarding the resource at time t42 that has been described in FIG. 8, the information regarding the resource that has been described in the first communication process of FIG. 7 and the information regarding the resource of FIG. 11 may be integrated together to be transmitted as a signal of information regarding the resource, or may be transmitted separately.

According to the wireless communication system 1 including the base station AP and the slave station STA using the communication device 10 as described above, the random access method capable of reducing the delay time and the scheduled access method capable of guaranteeing the worst value of the delay time can be used together, so as to achieve low-delay communication stably on an unlicensed band.

Further, as in the second communication process example, in the case where the time resource on the frequency band (the second frequency band in the above example) using the scheduled access method that has been allocated to a predetermined slave station STA is not used, another communication device 10 conducts communication using a free time resource. This increases the frequency of using the resource (the time resource) that has been secured on the frequency band using the scheduled access method, and enables prevention of a decrease in communication efficiency due to an unused resource.

In the first communication process example described above, the same time resource is allocated to a plurality of slave stations STA. This case also increases the frequency of using the resource (the time resource) that has been secured on the frequency band using the scheduled access method, and enables the prevention of a decrease in communication efficiency due to an unused resource.

It is to be noted that in the above-described example, the slave station STA transmits the information regarding the traffic (Traffic Info), and the base station AP allocates the time resource on the basis of the information regarding the traffic, and transmits the information regarding the resource (Schedule).

However, these functions may be reversed. That is, the base station AP may transmit the information regarding the traffic, so that the slave station STA may allocate the time resource on the basis of the information regarding the traffic, and may transmit the information regarding the resource.

It is to be noted that the communication device 10 may be configured as a part (for example, a communication module, a communication chip, or the like) of a device constituting the base station AP or the slave station STA. Further, the communication device 10, the base station AP, or the slave station STA can be configured as (a part of) an electronic device having a wireless communication function, for example, a smartphone, a tablet terminal, a mobile telephone, a personal computer, a digital camera, a game machine, a television receiver, a wearable terminal, a speaker device, or the like.

Further, in the above description, the communication means not only wireless communication but also communication in which wireless communication and wired communication are mixed together, that is, the wireless communication is conducted in a certain segment and the wired communication is conducted in another segment. Furthermore, the communication from one device to another device may be conducted by the wired communication, and the communication from another device to one device may be conducted by the wireless communication.

The embodiments of the present technology are not limited to the above-described embodiments, and various changes can be made without departing from the gist of the present technology.

In the present specification, it is a matter of course that the steps described in the flowchart are performed in a time-series manner according to the described order, but the steps may not necessarily be performed in a time-series manner and may be performed in parallel, at a necessary timing when a call is made, or the like.

It is to be noted that the effects described in the present specification are merely non-limiting examples, and effects other than those described in the present specification may be present.

It is to be noted that the present technology can also have the following configurations.

(1)

A communication device including:
  a first communication unit configured to communicate on a first frequency band that is an unlicensed band;
  a second communication unit configured to communicate on a second frequency band that is an unlicensed band different from the unlicensed band of the first frequency band; and
  a controller configured to control transmission of data using either one frequency band of communication on the first frequency band or the communication on the second frequency band on the basis of information regarding a resource on the second frequency band transmitted from a first communication device.

(2)

The communication device described in the above (1),
  in which the first communication unit conducts the communication on the first frequency band in a first method for obtaining a communication opportunity in an autonomously distributed manner, and
  the second communication unit conducts the communication on the second frequency band in a second method for using the communication opportunity that has been allocated by the first communication device.

(3)

The communication device in the above (1) or (2),
  in which the controller controls the transmission of the data using a frequency band with which the transmission is determined to be completed earlier, out of the communication on the first frequency band and the communication on the second frequency band.

(4)

The communication device in one of the above (1) to (3),
  in which the controller causes either the first communication unit or the second communication unit to transmit information regarding traffic to the first communication device.

(5)

The communication device in one of the above (1) to (4),
  in which the controller conducts the communication using the second frequency band on the basis of the information regarding the resource, while suppressing the transmission on the first frequency band.

(6)

The communication device in one of the above (1) to (5),
  in which in a case where a determination that a resource allocation of a second communication device is not used is made, the controller controls the communication to be conducted by using a resource of the second communication device.

(7)

The communication device in the above (6),
in which a determination of whether the resource allocation of the second communication device is not used is carried out on the basis of a carrier sense.

(8)

The communication device in the above (6) or (7),
in which the communication of a case where the determination that the resource allocation of the second communication device is not used is made is conducted within the resource that has been allocated to the second communication device.

(9)

The communication device in one of the above (6) to (8),
in which the communication of a case where the determination that the resource allocation of the second communication device is not used is made is conducted on the basis of information regarding a communication method of a communication device to which no resource is allocated.

(10)

The communication device in the above (9),
in which the information regarding the communication method of the communication device to which no resource is allocated includes information regarding a method for obtaining a transmission opportunity.

(11)

A communication method by a communication device including
a first communication unit configured to communicate on a first frequency band that is an unlicensed band, and
a second communication unit configured to communicate on a second frequency band that is an unlicensed band different from the unlicensed band of the first frequency band,
the communication method including
controlling transmission of data using either one frequency band of communication on the first frequency band or the communication on the second frequency band on the basis of information regarding a resource on the second frequency band transmitted from a first communication device.

(12)

A communication device including:
a first communication unit configured to communicate on a first frequency band that is an unlicensed band;
a second communication unit configured to communicate on a second frequency band that is an unlicensed band different from the unlicensed band of the
first frequency band; and a controller configured to allocate a resource of another communication device on the second frequency band on the basis of information regarding traffic that has been obtained from the another communication device via either the first communication unit or the second communication unit.

(13)

The communication device in the above (12),
in which the first communication unit conducts communication on the first frequency band in a first method by the another communication device for obtaining a communication opportunity in an autonomously distributed manner, and
the second communication unit conducts the communication on the second frequency band in a second method by the another communication device for conducting the communication using the resource that has been allocated by the communication device.

(14)

The communication device in the above (12) or (13),
in which an allocation of the resource of the another communication device is determined on the basis of a maximum allowable delay time of data included in the information regarding the traffic.

(15)

The communication device in one of the above (12) to (14),
in which an allocation of the resource of the another communication device includes the allocation of a same resource to a plurality of the another communication devices.

(16)

The communication device in one of the above (12) to (15),
in which information regarding the allocation of the resource of the another communication device is transmitted to a plurality of communication devices including the another communication device.

(17)

The communication device in the above (16),
in which the information regarding the allocation of the resource of the another communication device includes information indicating that another communication device to which no resource is allocated is allowed to conduct the communication.

(18)

The communication device in the above (16) or (17),
in which the information regarding the allocation of the resource of the another communication device includes information regarding a communication method of a case where another communication device to which no resource is allocated conducts the communication.

(19)

The communication device in the above (18),
in which the information regarding the communication method includes information regarding a method for obtaining a transmission opportunity.

(20)

A communication method by a communication device including
a first communication unit configured to communicate on a first frequency band that is an unlicensed band, and
a second communication unit configured to communicate on a second frequency band that is an unlicensed band different from the unlicensed band of the first frequency band,
the communication method including
allocating a resource of another communication device on the second frequency band on the basis of information regarding traffic that has been obtained from the another communication device via either the first communication unit or the second communication unit.

REFERENCE SIGNS LIST

1 Wireless communication system
AP (AP1, AP2) Base station
STA (STA1a, STA1b, STA2) Slave station
10 Communication device
21 Controller
22 (22A, 22B) Communication unit
31 Data processing unit
32 Wireless controller

The invention claimed is:

1. A communication device comprising:
a first transceiver configured to communicate on a first frequency band that is an unlicensed band;
a second transceiver configured to communicate on a second frequency band that is an unlicensed band different from the unlicensed band of the first frequency band; and
a controller configured to perform control operations for controlling a transmission via either the first frequency band or the second frequency band,
wherein the control operations comprise:
transmitting a notification to a base station of traffic handled by the communication device;
based on the notification, receiving, from the base station, information regarding one or more time resources on the second frequency band assigned to the communication device;
determining whether data for transmission has been generated;
upon determining that the data for transmission has been generated, determining whether there is a first time resource of the one or more time resources on the second frequency band capable of transmitting the data earlier than a transmission on the first frequency band,
upon determining that there is the first time resource of the one or more time resources on the second frequency band that is capable of transmitting the data earlier than a transmission on the first frequency band, begin transmitting the data via the first time resource of the one or more time resources on the second frequency band,
upon determining that there is not any time resource of the one or more time resources on the second frequency band that is capable of transmitting the data earlier than a transmission on the first frequency band, starting a process to obtain a transmission opportunity on the first frequency band based on a predetermined collision avoidance process,
wherein the process to obtain the transmission opportunity on the first frequency band comprises:
based on the predetermined collision avoidance process, determining whether it is necessary to suppress a transmission of the data via the first frequency band;
upon determining that determine it is necessary to suppress the transmission of the data via the first frequency band, determining whether there is a second time resource of the one or more time resources on the second frequency band capable of transmitting the data earlier than a transmission on the first frequency band that includes a corresponding suppression period; and
upon determining that there is the second time resource of the one or more time resources on the second frequency band that is capable of transmitting the data earlier than the transmission on the first frequency band that includes a corresponding suppression period, begin transmitting the data via the second time resource of the one or more time resources on the second frequency band.

2. The communication device according to claim 1, wherein the control operations further comprise:
upon determining that determine it is not necessary to suppress the transmission of the data via the first frequency band, obtaining the transmission opportunity on the first frequency band and begin transmitting the data at the start of the obtained transmission opportunity.

3. The communication device according to claim 1, wherein the control operations further comprise:
upon determining that there is no time resource of the one or more time resources on the second frequency band that is capable of transmitting the data earlier than the transmission on the first frequency band that includes a corresponding suppression period, obtaining the transmission opportunity on the first frequency band and begin transmitting the data at the start of the obtained transmission opportunity.

4. A communication method by a communication device including a first transceiver configured to communicate on a first frequency band that is an unlicensed band, and a second transceiver configured to communicate on a second frequency band that is an unlicensed band different from the unlicensed band of the first frequency band, the communication method comprising:
performing control operations for controlling a transmission via either the first frequency band or the second frequency band,
wherein the control operations comprise:
transmitting a notification to a base station of traffic handled by the communication device;
based on the notification, receiving, from the base station, information regarding one or more time resources on the second frequency band assigned to the communication device;
determining whether data for transmission has been generated;
upon determining that the data for transmission has been generated, determining whether there is a first time resource of the one or more time resources on the second frequency band capable of transmitting the data earlier than a transmission on the first frequency band,
upon determining that there is the first time resource of the one or more time resources on the second frequency band that is capable of transmitting the data earlier than a transmission on the first frequency band, begin transmitting the data via the first time resource of the one or more time resources on the second frequency band,
upon determining that there is not any time resource of the one or more time resources on the second frequency band that is capable of transmitting the data earlier than a transmission on the first frequency band, starting a process to obtain a transmission opportunity on the first frequency band based on a predetermined collision avoidance process,
wherein the process to obtain the transmission opportunity on the first frequency band comprises:
based on the predetermined collision avoidance process, determining whether it is necessary to suppress a transmission of the data via the first frequency band;
upon determining that determine it is necessary to suppress the transmission of the data via the first frequency band, determining whether there is a second time resource of the one or more time resources on the second frequency band capable of transmitting the data earlier than a transmission on the first frequency band that includes a corresponding suppression period; and
upon determining that there is the second time resource of the one or more time resources on the second frequency band that is capable of transmitting the data earlier than the transmission on the first frequency band that includes a corresponding suppression period, begin transmitting the data via the second time resource of the one or more time resources on the second frequency band.

5. A non-transitory computer product containing instructions that cause a processor of a communication device to perform a communication method, the communication device including a first transceiver configured to communicate on a first frequency band that is an unlicensed band, and a second transceiver configured to communicate on a second frequency band that is an unlicensed band different from the unlicensed band of the first frequency band, the communication method comprising:
- performing control operations for controlling a transmission via either the first frequency band or the second frequency band,
- wherein the control operations comprise:
- transmitting a notification to a base station of traffic handled by the communication device;
- based on the notification, receiving, from the base station, information regarding one or more time resources on the second frequency band assigned to the communication device;
- determining whether data for transmission has been generated;
- upon determining that the data for transmission has been generated, determining whether there is a first time resource of the one or more time resources on the second frequency band capable of transmitting the data earlier than a transmission on the first frequency band,
- upon determining that there is the first time resource of the one or more time resources on the second frequency band that is capable of transmitting the data earlier than a transmission on the first frequency band, begin transmitting the data via the first time resource of the one or more time resources on the second frequency band,
- upon determining that there is not any time resource of the one or more time resources on the second frequency band that is capable of transmitting the data earlier than a transmission on the first frequency band, starting a process to obtain a transmission opportunity on the first frequency band based on a predetermined collision avoidance process,
- wherein the process to obtain the transmission opportunity on the first frequency band comprises:
  - based on the predetermined collision avoidance process, determining whether it is necessary to suppress a transmission of the data via the first frequency band;
  - upon determining that determine it is necessary to suppress the transmission of the data via the first frequency band, determining whether there is a second time resource of the one or more time resources on the second frequency band capable of transmitting the data earlier than a transmission on the first frequency band that includes a corresponding suppression period; and
  - upon determining that there is the second time resource of the one or more time resources on the second frequency band that is capable of transmitting the data earlier than the transmission on the first frequency band that includes a corresponding suppression period, begin transmitting the data via the second time resource of the one or more time resources on the second frequency band.

6. A processor configured to be installed in a communication device that includes a first transceiver configured to communicate on a first frequency band that is an unlicensed band, a second transceiver configured to communicate on a second frequency band that is an unlicensed band different from the unlicensed band of the first frequency band, wherein the processor is configured to perform control operations for controlling a transmission via either the first frequency band or the second frequency band, wherein the control operations comprise:
- transmitting a notification to a base station of traffic handled by the communication device;
- based on the notification, receiving, from the base station, information regarding one or more time resources on the second frequency band assigned to the communication device;
- determining whether data for transmission has been generated;
- upon determining that the data for transmission has been generated, determining whether there is a first time resource of the one or more time resources on the second frequency band capable of transmitting the data earlier than a transmission on the first frequency band,
- upon determining that there is the first time resource of the one or more time resources on the second frequency band that is capable of transmitting the data earlier than a transmission on the first frequency band, begin transmitting the data via the first time resource of the one or more time resources on the second frequency band,
- upon determining that there is not any time resource of the one or more time resources on the second frequency band that is capable of transmitting the data earlier than a transmission on the first frequency band, starting a process to obtain a transmission opportunity on the first frequency band based on a predetermined collision avoidance process,
- wherein the process to obtain the transmission opportunity on the first frequency band comprises:
  - based on the predetermined collision avoidance process, determining whether it is necessary to suppress a transmission of the data via the first frequency band;
  - upon determining that determine it is necessary to suppress the transmission of the data via the first frequency band, determining whether there is a second time resource of the one or more time resources on the second frequency band capable of transmitting the data earlier than a transmission on the first frequency band that includes a corresponding suppression period; and
  - upon determining that there is the second time resource of the one or more time resources on the second frequency band that is capable of transmitting the data earlier than the transmission on the first frequency band that includes a corresponding suppression period, begin transmitting the data via the second time resource of the one or more time resources on the second frequency band.

* * * * *